United States Patent [19]
Anfindsen

[11] 3,753,384
[45] Aug. 21, 1973

[54] APPARATUS FOR THE ADJUSTMENT OF THE WORKING PRESSURE OF A TOOL

[76] Inventor: Ole Arnt Anfindsen, Gudesgt 18, 3600 Kongsberg, Norway

[22] Filed: Oct. 12, 1971

[21] Appl. No.: 188,178

[30] Foreign Application Priority Data

Oct. 12, 1970  Norway..............................3823

[52] U.S. Cl. ................. 90/24 R, 33/18 R, 82/24 R, 90/11 C, 90/24.4, 178/6.6 B, 310/14, 346/141, 408/129
[51] Int. Cl........................... B23d 13/00, B23q 5/28
[58] Field of Search ................. 90/24.4, 11 E, 11 C, 90/24 R; 178/6.6 B; 346/141; 33/18 R, 23 C; 82/DIG. 9, 24 R; 310/14; 408/129

[56] References Cited
UNITED STATES PATENTS

| | | |
|---|---|---|
| 3,149,902 | 9/1964 | Dransfield............................ 346/141 |
| 3,184,754 | 5/1965 | Peltola................................. 346/141 |
| 2,066,261 | 12/1936 | Finch ................................. 178/6.6 B |
| 3,527,138 | 9/1970 | Boltz..................................... 90/11 E |
| 1,933,792 | 11/1933 | Dalton................................. 178/6.6 B |

*Primary Examiner*—Francis S. Husar
*Attorney*—Watson, Cole, Grindle & Watson

[57] ABSTRACT

A machining tool is attached to a current carrying annular coil which is mounted for axial movements in an associated annular gap of a magnetic circuit, energized by at least one suitable permanent magnet and/or electromagnet. The terminal leads of the coil are connected to a variable current source. In this arrangement the working pressure of the tool against a workpiece may be very accurately regulated by suitable adjustment of the current supplied to the coil from the variable current source.

6 Claims, 1 Drawing Figure

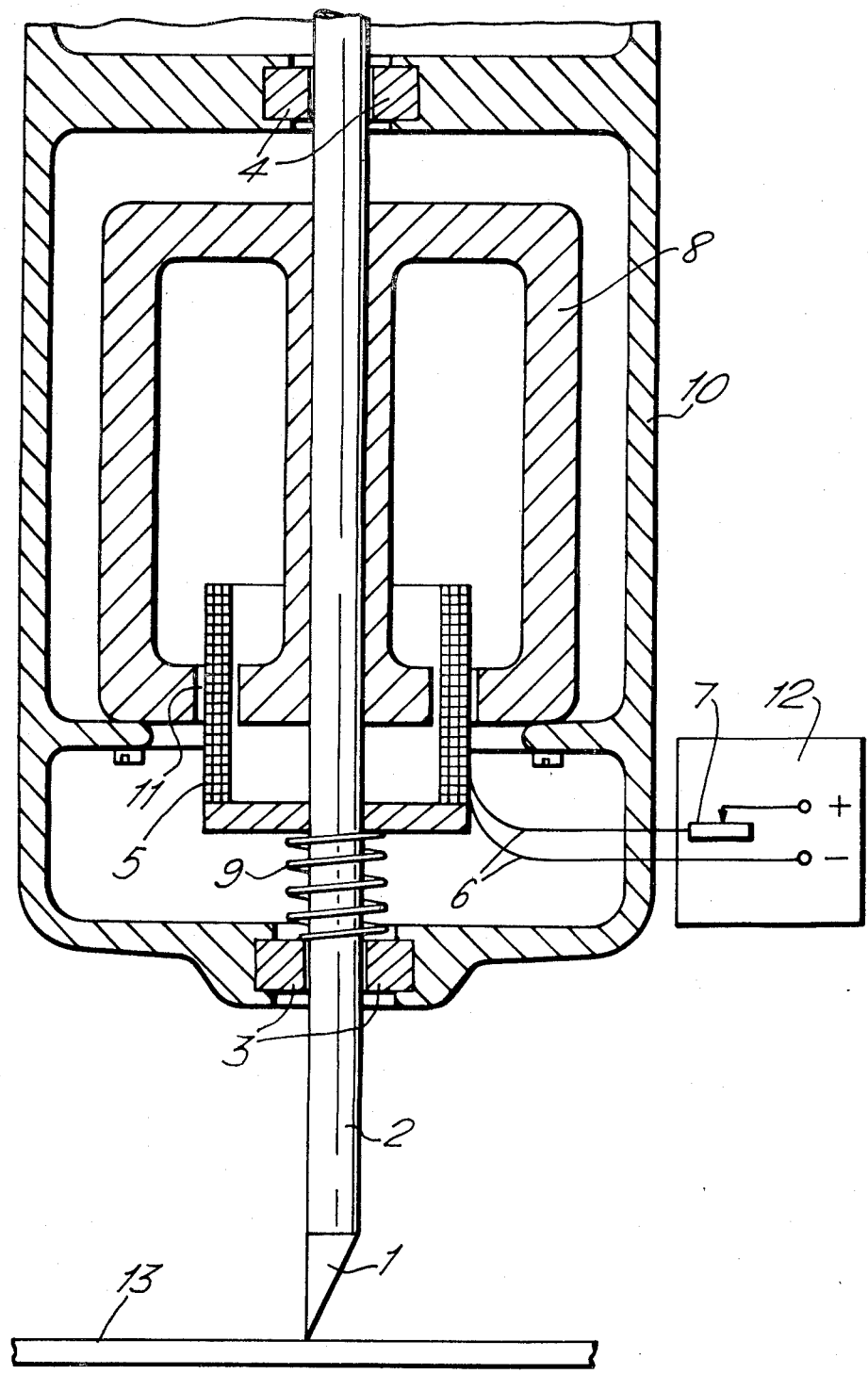

APPARATUS FOR THE ADJUSTMENT OF THE WORKING PRESSURE OF A TOOL

The present invention relates to an apparatus for the adjustment of the working pressure of a cutting, planing or scribing tool against a workpiece, in particular a combined foil of e.g., plastic material, to secure a machining of said material down to a predetermined depth by means of said tool. The invention is particularly adaptable to machining of plastic foils, on which a cutting tool is used to remove a covering coating in accordance with a predetermined pattern and in such a manner that said covering coating is removed without allowing the cutting tool to penetrate into the underlaying basic layer.

A number of methods have previously been applied to achieve this object. As the total thickness of foil usually is constant and known, it is possible to perform such machining by controlling the penetration of the tool into the workpiece with the workpiece support as a reference plane. This method, however, is not suitable if said foils are very thin and are to be machined to very close tolerances, as in this case even small contaminations of the workpiece or its support may result in hetrogenous products of not satisfactory quality.

Better results have been achieved by setting the working pressure of the tool against the workpiece to a suitable value as said tool is operatively moving with a predetermined velocity along said workpiece. This may be accomplished by balancing the tool and the tool suspension in such a way that the edge of the tool only rests on the workpiece with sufficient pressure to secure the desired machining depth. It is also known that the same effect may be obtained by attaching said tool to a system of bias springs.

Both the last mentioned methods have a number of disadvantages. Said balancing of the tool and the tool suspension is apt to give a complex and rather unstable construction, and further entails certain special problems, as the auxiliary mass to an appreciable extent increases the inertia of the moving system, so that harmful marks may be deposited on the workpiece at the place where the tool is set down.

On the other hand, a suspension in bias springs is difficult to adjust because of the unlinear characteristics of such springs, and a reasonably rapid adjustment of the pressure may only take place in comparatively coarse steps.

Thus, the main object of the invention is to overcome said disadvantages, and according to the invention this is achieved by attaching said tool to an annular electric coil, which is disposed to be axially movable in an associated annular gap of a magnetic circuit, which is energized by means of at least one permanent magnet and-/or electromagnet, the coil being supplied with electric current from a variable current source.

Further, this apparatus according to the invention preferably comprises a bias spring disposed to balance the weight of the tool and the coil in such a way that these parts are maintained in a predetermined rest position when the coil is currentless.

Thus, as the coil is disposed in a magnetic field which is mainly directed perpendicularly to the coiled conductors, said coil will be exposed to an axial force which is substantially proportional to the current through the coil, so that the associated tool may be forced against the workpiece with a corresponding pressure. By means of suitable current regulating means this pressure may be very accurately adjusted, so that the machining depth, in dependence of the velocity of tool, may be set to the desired value within very close tolerance limits.

Further features and characteristics of the apparatus according to the invention, may be apparent from the following description by way of example of an embodiment of the invention, with reference to the accompanying drawing.

In the drawing a tool 1 is shown mounted on a shaft 2, which is slidably journalled in bearings 3, 4. Further disposed on the shaft 2 is an annular electric coil 5, the terminal leads 6 of which are connected to a directed current source 12, which comprises a variable resistance 7. The coil 5 is mounted concentrically with the shaft 2 in the air gap 11 of an annular permanent magnet 8. A bias spring 9 is inserted between the coil 5 and a housing 10 which housing surrounds the entire apparatus, except the tool 1 and part of the shaft 2, which projects out of the housing. The permanent magnet 8 is bolted to the housing 10.

In the rest position, when no current is supplied to the coil 5, the bias spring 9 will maintain the shaft 2 with the tool 1 in a more or less retracted position. When current is supplied to the coil 5, the spring force will be overcome and the tool 1 will be moved outwards to a working position in contact with the workpiece 13. The desired working pressure is now set by adjusting the current through the coil 5 by means of the variable resistance 7.

The embodiment described above is by no means to be considered as the only possible embodiment of the invention. Thus, the permanent magnet may be replaced by or combined with at least one electromagnet, and the tool 1 may either be rigidly attached to the coil 5 or, as indicated in the drawing, mounted in such a way that the tool may be rotated, but not axially displaced with respect to the coil 5.

To be able to raise the tool 1 rapidly from the workpiece 13 when a machining operation is to be terminated, the variable current source may be operative to effect a quick reversal of the polarity of the current supplied to the coil 5.

When a more complex and rapidly varying machining is needed, the current source 12 may also according to the invention, comprise a controllable power amplifier for continuous adjustment of the current through the coil 5. This amplifier may, e.g., be automatically controlled by a suitably programmed data processor.

I claim:

1. A cutting, planing or scribing apparatus with continuously adjustable cutting tool pressure and comprising:
   a. a magnetic circuit energized by means of at least one permanent magnet and/or electromagnet and comprising an annular gap;
   b. an annular electric coil axially movably disposed in said gap in the magnetic circuit;
   c. a variable current source electrically connected to said coil and operative to supply adjustable electric current to the same, and
   d. a cutting tool attached to the electric coil and operative to engage a suitably disposed workpiece, the tool pressure against the workpiece being determined by the current supplied from the variable current source to the coil.

2. An apparatus as claimed in claim 1, and further comprising a bias spring disposed to balance the weight of the tool and the coil in such a way that these parts are maintained in a predetermined rest position when the coil is currentless.

3. An apparatus as claimed in claim 1, wherein the variable current source is adjusted to effect a reversal of the polarity of the current supplied to the coil, when the machining operation of the tool is to be terminated.

4. A method of continuously adjusting the working pressure of a cutting tool against a workpiece in a machining operation, comprising:
providing a magnetic circuit comprising an annular gap, and energizing said circuit by means of at least one permanent magnet and/or electromagnet;
interconnecting an annular electric coil axially with said tool;
disposing said coil for axial movement in said gap in the magnetic circuit;
supplying an adjustable elect1ric current to said coil through a variable current source electrically connected to said coil to thereby axially move said coil in said gap; and
applying current to said coil from said variable current source to thereby regulate the pressure of said tool against the workpiece.

5. The method of claim 4 further comprising the step of spring biasing said connected coil and tool for balancing the weight thereof to maintain said coil and tool in a predetermined rest position when said coil is supplied with no current.

6. The method of claim 4 wherein said variable current source is adjusted to effect a reversal of the polarity of the current supplied to said coil when the machining operation of said tool is to be terminated.

* * * * *